Patented Oct. 10, 1939

2,175,340

UNITED STATES PATENT OFFICE 2,175,340

VITAMINIZING MALTED LIQUORS

Jacques W. D. Chesney, Chicago, Ill., assignor to New Discoveries, Inc., Chicago, Ill., a corporation No Drawing. Application March 27, 1936, Serial No. 71,331

3 Claims. (Cl. 99—11)

The present invention relates to a process for incorporating vitamin D with malted or fermented liquors in such a manner as to insure both the stability of the added vitamin and the foaming properties of the liquor.

One of the objects of the invention is to incorporate vitamin D with malted liquors in such a manner that the potency of the vitamin is not impaired, nor the foaming properties of the liquors interfered with.

A further object of the present invention is to prepare vitamin D in such a form that it may be dissolved or completely dispersed in malted liquors in such form that it will remain therein without separation; and to do this in a medium that is substantially free from oil or fat, which latter might interfere with the development of foam on the liquor when poured out into the glass.

Still a further object of the invention relates to the preparation of a standardized solution of vitamin D in an alcohol, so that it may be incorporated with the malted liquors in a simple and efficacious manner.

Other objects of the invention will become apparent from the further description herein and the claims.

The desirability of incorporating vitamin D with malted liquors, such as beer, ale, porter, stout and the like is predicated upon the fact that persons using such liquors very rarely drink milk or milk preparations that contain vitamin D. Such milk or milk preparations contain valuable phosphorus and lime salts or compounds, which are required for the proper development of the bone structure of the human body, and its maintenance in a healthy and vigorous condition. This is particularly true of the teeth, it having been definitely shown that much of the tooth decay found in human beings is caused by lack of proper calcium assimilation. Now in order properly to assimilate calcium, it is necessary that sufficient calcium salts be supplied to the body, but these can only be assimilated if the body also has an adequate supply of vitamin D.

In general, those using malted or fermented liquors (under which term is to be included also wine, champagne and the like as distinguished from mineral-free distilled liquors) eat considerable quantities of cabbage, kraut, carrots, etc., which provide an adequate amount of vitamin A, as well as calcium and phosphorus, but are deficient in vitamin D. While most malted liquors contain sufficient calcium and lime, they are, on the other hand, deficient in vitamin D. It is, moreover, necessary to have both an adequate supply of vitamin D as well as the supply of calcium and phosphorus in order to build bone structure and to guard against decay of the teeth and the development of rickets.

Malted liquors are also excellent galactagogs and hence very desirable in the diet of nursing mothers; hence if such liquors also carry an adequate supply of vitamin D, adequate development of the child's teeth and bone structure is assured.

It is therefore highly desirable to incorporate some form of vitamin D with malted and fermented liquors. Inasmuch as these, however, have certain desirable foaming properties, upon which to a considerable extent their palatability depends, it logically follows that if the addition of vitamin D will impair the "bead" on the malted liquor—such as beer and ale, for example—its commercial value will be greatly decreased. Now it is known that fatty and oily substances effectively prevent the forming of foam or "a bead" on beer, etc. As most of the materials containing vitamin D are of an oily or fatty nature, such as are the fish-oils containing this vitamin, the addition of such oils to the liquor would prevent it from properly foaming when poured out into a glass. It therefore is necessary to prepare a special form of vitamin D which may be added to the malted liquor without impairing the foaming property thereof.

Taking the above facts into consideration, the value of the present invention will be better understood. The first step in the invention consists in the preparation of a suitable form of vitamin D, and the second in its proper incorporation with the malted liquor under conditions which will insure its potency, and the permanence of the resultant mixture.

In order to prepare the vitamin D for the present purpose, the following procedure may be followed to advantage. The starting material, or pro-vitamin as it is sometimes known, may either be cholesterol or ergosterol, preferably the latter, as this gives a far greater yield of vitamin D per unit of pro-vitamin.

Thus, either 200 grams of cholesterol, or, preferably, 20 grams of ergosterol are dissolved in about 3 kilograms of substantially anhydrous ethyl ether. The resulting solution is then irradiated with ultraviolet light while spread out in a thin film. This can be done, for example, by flowing the ether solution over a flat plate such as glass or metal, while covered with a second plate in which holes have been provided for access of the ultraviolet light-rays. Or the ether solution may be flowed between plates made of quartz glass or other material that is transparent to the ultraviolet rays. Any suitable mechanical device which will accomplish the irradiation of the ether solution is to be considered as within the scope of the present invention. About 20% of the convertible pro-vitamin will be thus converted into vitamin D by the effect of the ultraviolet radiations.

The irradiated ethereal solution of ergosterol (or cholesterol), containing the freshly formed vitamin D, is then conveyed into a closed tank, and carbon dioxide or other equivalent inert gas is passed through the solution so as to displace any air in the tank. This is done to prevent loss of the vitamin D by oxidation to which it is quite sensitive. The solution is then artificially refrigerated in any suitable manner so as to reduce its temperature to about zero degrees Fahrenheit, or even lower. This will cause the precipitation of that portion of the pro-vitamin (i. e. either ergosterol or cholesterol) which has not been converted into vitamin D by the irradiation. The solution, while still kept at the stated low temperature, is then rapidly filtered. The filtrate will contain the vitamin D, while the residue remaining on the filter contains the pro-vitamin. The latter may then be re-dissolved in a fresh portion of ether, to be irradiated either by itself, or after the addition of further ergosterol or cholesterol.

The filtrate containing the vitamin D is then evaporated to substantial dryness in an inert atmosphere (which may be merely the ether vapors themselves) under reduced pressure or partial vacuum, so that little heat will be necessary to volatilize the ether. The latter is condensed and recovered for further use. The residue remaining after the removal of the ether is a waxy material containing the vitamin D. This waxy material is then treated with 90% ethyl alcohol, which will dissolve the actual vitamin D, but will leave behind the waxy constituents. The alcoholic solution is then filtered and stored in either a completely filled container or in one in which the space above the alcohol is devoid of oxygen. Carbon dioxide may be used to replace the air above the solution. The object of this precaution is to prevent deterioration of the vitamin D by oxidation.

The alcohol solution of vitamin D thus produced is then biologically assayed by the well known rat-test. After the actual strength of the solution has been thus ascertained, it is diluted with 90% ethyl alcohol until each cubic centimeter thereof is equivalent to 20,000 U. S. P. X. units of vitamin D. This standard stock solution is the source of the vitamin D that is put into the malted liquors.

In order to understand how the vitamin D, prepared as above described, is incorporated with the malted liquor, it may be well to state briefly how these liquors are generaly made. The grain, principally barley, is first malted by subjecting it to moisture and heat sufficient to cause the grain to germinate. This causes a modification of the starches due to the action of enzymes. After malting, the malted grain is kiln-dried by means of heat. This is done principally to prepare it for milling. It is then ground or crushed, the resultant mass being known as grist.

Then follows the mashing. The grist is mixed with water, and additional water, previously heated, is added so as to bring the temperature up to about 145–155° F. This action causes the conversion of the starch into dextrine, dextromaltose, etc. The water should contain small amounts of calcium salts such as the chloride or sulphate, and if not present these salts should be added to equal about 35 grains of calcium chloride per gallon and 5 to 7 grains of calcium sulphate per gallon.

The fluid from the mashing is called wort. The wort is run into copper kettles and brought to a temperature sufficient to render diastase inactive and prevent further conversion of malto-dextrine. Given quantities of hops are then added to the wort and the whole boiled to extract the principle of hops, kill bacteria, moulds and yeasts, as well as to coagulate proteid matter. The hops are then filtered out in a "hop jack" and the liquid refrigerated by air and also by mechanical refrigeration. The liquid is run into a tank and allowed to settle. The clear portion is then drawn off into fermentation tubs and definite amounts of yeast culture added. Shortly active fermentation begins. The clear portion is drawn into fermentation tanks carrying with it sufficient yeast to continue the fermentative process. After about ten days the fermentation practically ceases, the temperature starts to fall and a large portion of the yeast cells collect in the bottom.

The thus-made new beer is then run into storage vats to finish fermentation and to age. The time of storage varies from 2 to 6 months. The finished clear beer is then drawn off from the cask leaving the major portion of the yeast cells and other detritus at the bottom. Some brewers run it through a filter of some type. The beer is then kegged and refrigerated, or is bottled or canned, and then pasteurized by heat. Keg beer is not pasteurized. The temperature required for pasteurization is 60–68° Cent. (140–154.4° F.) for about 30 minutes.

The addition of the alcoholic solution of vitamin D to the malted liquor, as for example the beer made about as above described, should take place at a stage in the manufacture of the beer where the fermenting liquor has an alcoholic content of at least one quarter of a per cent and while carbon dioxide is present in adequate amounts to prevent oxidation of the vitamin. The preferred way of adding the vitamin is to add enough of the 20,000 U. S. P. X. units per cc. solution to the beer so that each 12 ounces thereof will contain about 100 U. S. P. X. units of vitamin D. The best time to add this solution is after the final filtering of the beer—just about the time that it is ready for kegging, canning, or bottling—and before the pasteurization, if the latter is employed. It can, however, be added to the beer that is being stored or "lagered."

It is important to avoid adding it to the beer or other malted liquor before the same contains carbon dioxide and at least ¼% of alcohol. The alcohol present in the liquor prevents the precipitation of the vitamin D, which, when the alcoholic solution is poured into the beer, would take place unless there were at least a small amount (¼%) of alcohol in the beer.

Malted liquors made in accordance with the present invention will contain about 100 U. S. P. X. units of vitamin D per 12-oz. bottle or can, and will retain this amount over periods of from six months to one year under ordinary storage conditions. The presence of $CO_2$ in the beer prevents oxidation of the vitamin D, while the alcohol prevents precipitation and settling out. Actual tests made on beer treated in accordance with the present invention have shown that even after standing for one year at ordinary room temperatures in closed containers it still contained the originally added amount of vitamin D.

Vitamin D may, obviously, also be added to wines and champagnes, so long as the addition takes place while there is carbon dioxide present and the addition is made after the clear wine is drawn from the dregs and settlings. By the term "fermented liquors" in the hereunto appended claims, any malted or fermented liquor is to be included, such as beer, ale, stout, porter, lager-beer, near-beer, wine, champagne, cider, and the like.

Where ultraviolet light is mentioned herein, this is to be understood as meaning light-rays having a wave length of from about 2000 to 3200 Angstrom units.

Equivalents such as will occur to those skilled in the art into which this invention falls are to be considered as within the scope of the purview of the claims.

I claim:

1. The process of producing fermented liquors containing viatmin D, which comprises the step of incorporating an oil-free alcoholic solution of vitamin D with said liquors at a stage in their manufacture where their alcoholic content is not less than about one-quarter of one per cent.

2. The process of producing fermented liquor containing vitamin D which comprises preparing an oil-free concentrated solution of vitamin D in a liquid that does not interfere with the foaming properties of the liquor, and adding sufficient of said concentrated solution to the fermented liquor at a stage in the manufacture of the latter where it contains at least one-quarter of one per cent of alcohol, and carbon dioxide in solution.

3. The process of producing beer containing vitamin D in stable form which comprises preparing a concentrated oil-free solution of vitamin D in alcohol, and adding a sufficient quantity of said solution to the beer just prior to its transfer to the commercial containers in which it is to be sold and while the beer contains at least one-quarter of one per cent of alcohol and also carbonic acid in solution.

JACQUES W. D. CHESNEY.